United States Patent [19]
Kawai et al.

[11] 4,275,590
[45] Jun. 30, 1981

[54] GAS FLOW MEASURING APPARATUS

[75] Inventors: Hisasi Kawai, Toyahashi; Tsuneyuki Egami, Aichi; Tokio Kohama, Nishio; Hideki Obayashi, Okazaki, all of Japan

[73] Assignee: Nippon Soken, Inc., Nishio, Japan

[21] Appl. No.: 97,665

[22] Filed: Nov. 27, 1979

[30] Foreign Application Priority Data

Dec. 27, 1978 [JP] Japan .................... 53/162705

[51] Int. Cl.³ .......................................... G01F 1/68
[52] U.S. Cl. ................................................. 73/204
[58] Field of Search ............... 73/116, 204; 323/75 N, 323/75 H, 75 E, 25

[56] References Cited

U.S. PATENT DOCUMENTS

| | | | |
|---|---|---|---|
| 3,975,951 | 8/1976 | Kohama et al. | 73/116 |
| 4,067,233 | 1/1978 | Obayashi et al. | 73/116 |
| 4,089,214 | 5/1978 | Egami et al. | 73/204 |

*Primary Examiner*—Herbert Goldstein
*Attorney, Agent, or Firm*—Cushman, Darby & Cushman

[57] ABSTRACT

Voltages at the diagonal points of a bridge circuit are amplified in an AC differential manner and half-wave rectified, which bridge circuit is formed of reference resistors and temperature dependent resistors located in front and rear of an electric heater in a duct through which air to be measured flows. The half-wave rectified voltage is sampled and held in synchronism with a control pulse signal from an oscillation circuit so that the sampling and holding operation is performed substantially at the center of the period during which the half-wave rectified voltage is produced. The held voltage and a constant reference voltage are amplified in a DC differential manner and then applied to a power amplifier circuit which controls a supply voltage to the electric heater. The voltage to be applied to the bridge circuit is an intermittent voltage which is produced by a chopper circuit.

5 Claims, 14 Drawing Figures

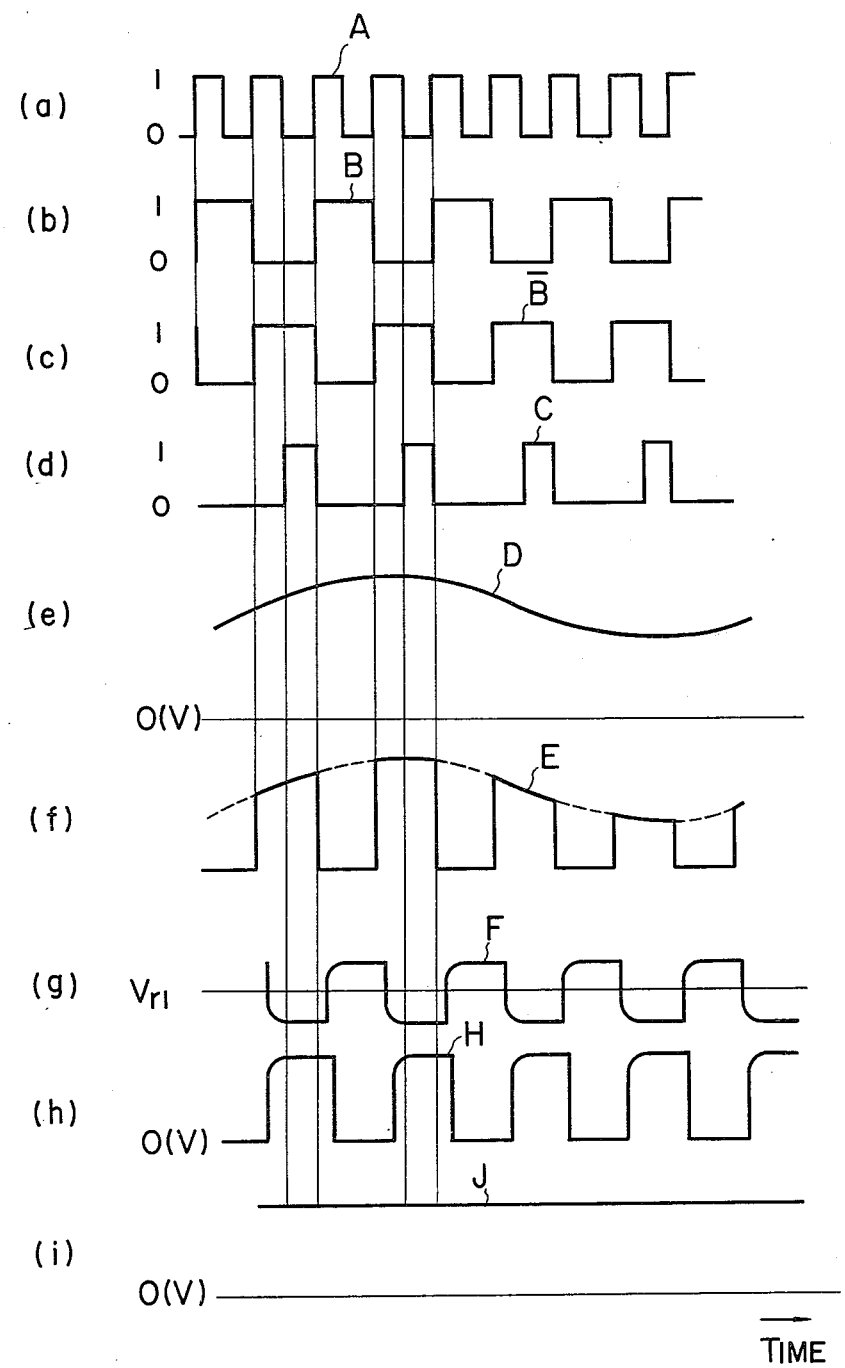

GAS FLOW MEASURING APPARATUS

CROSS REFERENCE TO RELATED APPLICATION

This application is related to U.S. Pat. application Ser. No. 92,024 entitled "GAS FLOW MEASURING DEVICE" filed on Nov. 7, 1979, by Hisashi Kawai, Tsuneyuki Egami, Tokio Kohama and Hideki Obayashi, assigned to the same assignee as that of this application.

BACKGROUND OF THE INVENTION

This invention relates to a gas flow measuring apparatus, and particularly to an apparatus for measuring the amount of flow of air which an engine, for example, sucks.

There has been proposed an air flow measuring apparatus of the type in which a suction duct of engine is provided with an air flow measuring tube including therein an electric heater and temperature dependent resistors each disposed in front of and in the rear of the heater, the output signals therefrom being used for measuring the flow of sucked air (gas to be measured).

This apparatus has advantages of small size and simple construction and of measuring accuracy being independent of the conditions in which apparatus is mounted. However, the construction is such that the two temperature dependent resistors and two additional reference resistors are used to constitute a bridge circuit to which a DC voltage is applied and that a diagonal voltage of the bridge is amplified by a DC differential amplifier and then used to control a voltage (or current) applied to the electric heater, thereby measuring air flow. Thus, current flows in the bridge at all times and hence a drift occurs degrading the measurement accuracy. In addition, a temperature drift takes place in the DC differential amplifier, also deteriorating the measurement accuracy.

Use of special low-drift elements in circuits to cope with the above problem will improve the measurement accuracy to some extent, but increase cost as compared with use of general-purpose elements. In addition, this can not fundamentally improve the accuracy.

SUMMARY OF THE INVENTION

An object of the present invention is to provide a gas flow measuring apparatus having little influence by drifts and having excellent circuit linearity sufficient to measure with good accuracy.

In particular, the gas flow measuring apparatus according to the invention comprises an oscillation circuit for producing a pulse signal, an AC differential amplifier for amplifying the diagonal voltages of a bridge circuit in an AC differential manner, a rectifying circuit for rectifying the output voltage of this AC differential amplifier circuit, a sample-and-hold circuit for sampling the output voltage from this rectifying circuit at a part of duration synchronized with the pulse signal from the oscillation circuit and for holding this sampled voltage, a DC differential amplifier circuit for differentially amplifying the output voltage from the sample-and-hold circuit and a constant reference voltage, a power amplifier circuit for amplifying the output voltage from the DC differential amplifier circuit to thereby control the voltage to be applied to the electric heater, and a chopper circuit for making the output voltage from the power amplifier circuit intermittent in synchronism with the pulse signal from the oscillation circuit and supplying this intermittent voltage to the bridge circuit. This construction can thus solve the previously mentioned problems.

According to the invention, there can be prevented the drift of the bridge circuit, the temperature drift of the amplifier circuit for detecting a potential difference of the bridge circuit, and the influence of rounding or dulling and phase shift of a signal waveform produced by the chopper thus to provide an excellent linearity, so that air flow measurement can be effectively made with good accuracy.

Other objects, features, and advantages of this invention will become apparent from the following description taken in conjunction with the accompanying drawings.

BRIEF DESCRIPTION OF THE DRAWINGS

FIGS. 5(a)–5(i) and 6 are graphs useful for explaining the operation.

DESCRIPTION OF THE PREFERRED EMBODIMENT

The present invention will hereinafter described with reference to the illustrated embodiment.

Figure 1:
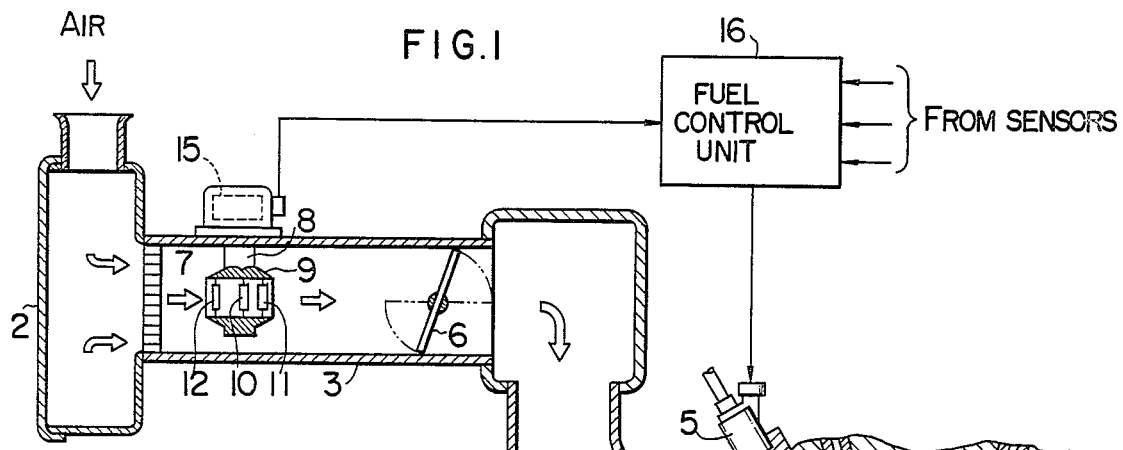
FIG. 1 is a whole construction showing one embodiment of the invention.

Referring to FIG. 1, there is shown a spark ignition engine for powering an automobile, air for combustion being sucked into its cylinder through an air cleaner 2, suction ducts 3 and 4 and an intake valve. Fuel is injected from an electromagnetic fuel injection valve 5 installed at the suction duct 4.

The suction duct 3 is provided with a throttle valve 6 which a driver can operate at will, and a rectifying grid 7 for rectifying air flow is provided at the junction between the suction duct 3 and the cleaner 2.

In the suction duct 3, a small-sized flow measuring tube 9 is supported between the rectifying grid 7 and the throttle valve 6 by a strut 8 to be substantially parallel with the axial direction of the duct 3. Within the flow measuring tube 9, there are provided an electric heater 10 made of platinum resistance wire, a first temperature dependent resistor 11 made of platinum resistance wire which is situated downstream close to the electric heater 10, and a second temperature dependent resistor 12 made of platinum resistance wire which is situated upstream to be slightly distant from the electric heater 10, as is schematically shown in FIG. 1.

Figure 2:
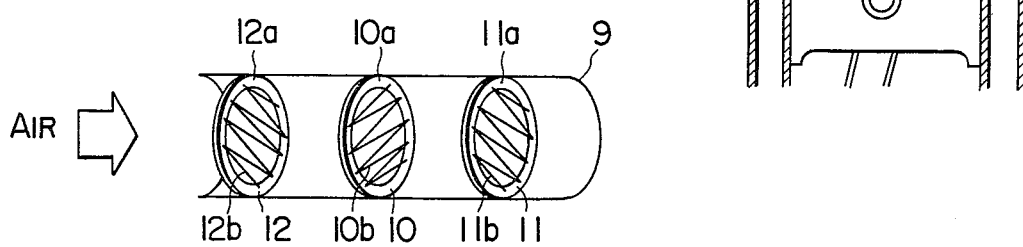
FIGS. 2 and 3 are respectively perspective and front views showing the electric heater and the first and second temperature dependent resistors as illustrated in FIG. 1.
Figure 3:
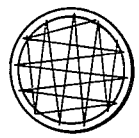

The electric heater 10 and the first and second temperature dependent resistors 11 and 12 are so constructed that platinum resistance wires 10b, 11b and 12b are provided in a lattice form on printed circuit boards 10a, 11a and 12a of an annular shape, respectively as shown in FIG. 2. In particular, the first and second temperature dependent resistors 11 and 12 are formed of a platinum resistance wire with the same resistance-temperature characteristic. In addition, the electric heater 10 and the first temperature dependent resistor 11 are positioned so that as viewed from the front (or rear), their resistance wires can intersect each other as shown in FIG. 3. Thus, the first temperature dependent resistor is not affected by a minute thermal distribution within the flow measuring tube 9 which distribution is caused by the heater 10.

Again referring to FIG. 1, the electric heater 10 and the first and second temperature dependent resistors 11 and 12 are connected to a measuring circuit 15, which measures the amount of sucked air flow by using the output signals therefrom and produces at its output an electrical signal in accordance with the amount of flow.

A fuel control unit 16 serves mainly to control the time during which the electromagnetic fuel injection valve 5 open, in response to the signal from the measuring circuit 15. To the fuel control unit 16 are also applied signals from different kinds of sensors for detecting the rotational speed of the engine, the temperature of cooling water, the concentration of oxygen in exhaust gases and so on. This fuel control unit 16 may be of well-known type, and thus the detailed description thereof will be omitted.

Figure 4:
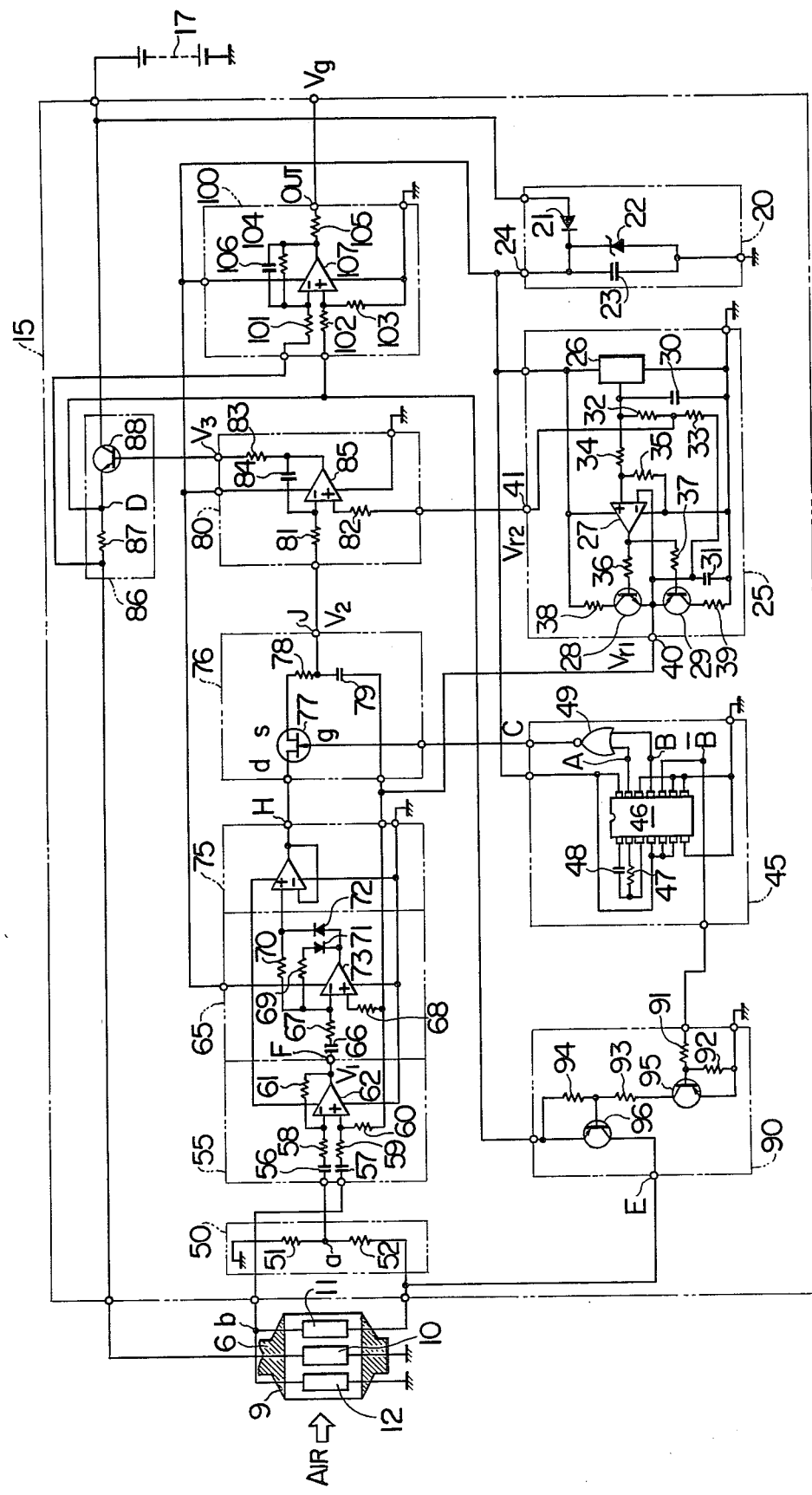
FIG. 4 is an electric circuit diagram showing the measurement circuit as shown in FIG. 1.

The measuring circuit 15 will next be described with reference to FIG. 4. The measuring circuit 15 is connected to a DC power supply 17 such as battery or the like to be powered thereby. A noise absorption circuit 20 in the measuring circuit 15 serves to absorb noise superimposed upon the power line from the power supply 17 and includes a diode 21, a Zener diode 22 and a capacitor 23. When the igniter of the engine 1, a starter motor and so on are operated, noise voltages are superimposed on the power line. In this embodiment, noise voltages higher than 20 [V] are absorbed by the Zener diode 22 and noise of 20[V] or below is absorbed by the diode 21 and the capacitor 23. Therefore, a DC voltage with little noise can be produced at a terminal 24.

In the event of reverse connection of the power supply 17 with its polarity inversed, the diode 21 contributes to prevention of current flowing to each circuit which will be described later.

A voltage generator circuit 25 for generating constant reference voltages $V_{r1}$ and $V_{r2}$ includes a voltage regulator (for example, $\mu$A78L62 made by Fairchild Camera & Instrument Corp.) 26, a differential operational amplifier (hereinafter, referred to as OP amp.) 27, transistors 28 and 29, capacitors 30 and 31 and resistors 32 to 39.

In this case, the OP amp 27 and the transistors 28 and 29 function as a current booster, which produces at a terminal 40 the reference voltage $V_{r1}$ of about 3[V] at allowable current, 30[mA] and provide an imaginary ground potential for circuits as described later. This imaginary ground potential is utilized for operation of the OP amps by a single power supply as described later, and selected to be a proper value considering the operating range and drifts of the OP amps.

The resistors 32 and 33 serve to divide the potential difference between the output voltage (for example, 6.2[V]) from the voltage regulator 26 and the reference voltage $V_{r1}$ at an appropriate ratio to produce the reference voltage $V_{r2}$ at a terminal 41.

An oscillation circuit 45 functions to produce an oscillation output for the chopper and sample-and-hold operation, and includes a multivibrator (for example, CD4047 made by RCA) 46, a resistor 47, a capacitor 48 and a NOR gate 49.

The multivibrator 46 is connected to function as an astable multivibrator, and produces at a terminal A a rectangular wave pulse signal A of about 8 kHz as shown in (a) of FIG. 5. In addition, the multivibrator produces at a terminal B a rectangular wave pulse signal B resulting from dividing the frequency of the pulse A by a factor of 2, as shown in (b) of FIG. 5, and at a terminal $\overline{B}$ a pulse signal $\overline{B}$ as a result of inverting the pulse signal B, as shown in (c) of FIG. 5.

The NOR gate 49 functions to receive the pulse signals A and B and produce at a terminal C a pulse signal C as shown in (d) of FIG. 5.

A reference resistor circuit 50 consists of reference resistors 51 and 52 connected in series, which are combined with the first and second temperature dependent resistors 11 and 12 to form a bridge circuit.

An AC differential amplifier circuit 55 functions to amplify the voltage difference between the diagonal points a and b of the above bridge circuit, and is formed by coupling capacitors 56 and 57, resistors 58 to 61 and an OP amp 62. The ground resistor 60, which is connected to the input terminal (+) of the OP amp 62, is supplied with the reference voltage $V_{r1}$ as the imaginary ground potential higher than the true ground potential.

The AC differential amplifier circuit 55 amplifies the potential difference of about 5[mV] in the bridge preferably at a gain factor of about 35 to 40.

A half-wave rectifying circuit 65 functions to rectify the half-waves of the output signal from the amplifier circuit 55, and includes a coupling capacitor 66, resistors 67 to 70, diodes 71 and 72 and an OP amp 73. To the ground resistor 68 is applied the reference voltage $V_{r1}$ as the imaginary ground potential.

In this half-wave rectifying circuit 65, the diode 72 is used in a feedback circuit thereby to assure linearity to a low voltage, and the OP amp 73 functions to amplify the output of the amplifier circuit 55 preferably at a gain factor of 25 to 30.

A buffer amplifier circuit 75 is a kind of impedance converter and is formed by an OP amp of voltage-follower connection.

A sample-and-hold circuit 76 functions to sample and hold the output of the buffer amplifier circuit 75, and consists of a field effect transistor (hereinafter, referred to as FET) 77, a resistor 78 and a capacitor 79 to which the reference voltage $V_{r1}$ is applied as the imaginary ground potential.

To the gate of the FET 77 is applied the output signal from the NOR gate 49 in the oscillation circuit 45, and thus the FET 77 is turned on and off by the "1" and "0" level of this output signal, respectively. When the FET 77 is turned on, the capacitor 79 is charged with a time constant of about 70 [$\mu$ seconds] to hold the output of the buffer amplifier circuit 75, and when the FET 77 is turned off, the capacitor 79 holds this charged voltage.

A DC differential amplifier circuit 80 functions to differentially amplify the output voltage from the sample-and-hold circuit 76 and the reference voltage $V_{r2}$, and consists of resistors 81 to 83, a capacitor 84 and an OP amp 85. The capacitor 84 is used for preventing the measuring circuit 15 from oscillating.

A power amplifier circuit 86 consists of an output resistor 87 and a power transistor 88, and functions to power-amplify the output voltage from the amplifier circuit 80 and supply the power output to the electric heater 10 and a chopper circuit 90.

The chopper circuit 90 functions to make intermittent (or chop) at regular intervals the voltage which is supplied from the power transistor 88 in the power amplifier circuit 86 to the bridge (the first and second temperature dependent resistors 10 and 11, and the reference resistors 51 and 52), and consists of resistors 91 and 94 and transistors 95 and 96.

In this case, this chopper circuit 90 is supplied with the pulse signal $\bar{B}$ from the oscillation circuit 45 thereby to perform the chopper operation (intermittence of voltage) and thus to supply a chopper output from a terminal E to the bridge.

A current detecting circuit 100 functions to detect the current supplied to the electric heater 10 by receiving the potential difference across the output resistor 87 and produce a voltage corresponding thereto, and consists of resistors 101 to 105, a capacitor 106 and an OP amp 107.

The circuit 100 is preferably set at a gain factor of about 8, and the capacitor 106 is used for prevention of oscillation.

The operation of the above arrangement will now be described. In FIG. 1, a certain amount of air, which is determined by the opening degree of the throttle valve 6, is applied from the air cleaner 2 through the suction duct 3 to within the cylinder of the engine 1. A specified part of the total sucked air is passed through the flow measuring tube 9 to the engine 1.

In the flow measuring tube 9, the second temperature dependent resistor 12, which is situated on the upstream side of the heater 10, is affected only by the temperature of the sucked air, while the first temperature dependent resistor 11 situated on the downstream side of the heater 10 is affected by both the temperature of the sucked air and the calorific value of the electric heater 10, i.e., it is affected by the temperature of the air heated by the electric heater 10 to which the voltage as shown in (e) of FIG. 5 is applied.

As a result, between the temperature dependent resistors 11 and 12 there occurs a temperature difference $\Delta T$ depending upon an amount of power P [W] applied to the heater 10 and an amount of flow G[g/sec] of the sucked air. The relationship among the P, G and $\Delta T$ is expressed by $$K_1 \cdot \Delta T = P/G \qquad (1)$$

where $K_1$ is a constant.

Since both temperature dependent resistors 11 and 12 are changed in resistance in accordance with the temperature of air, when the resistors 11 and 12 are supplied with the choppered voltage, as shown in (f) of FIG. 5, from the chopper circuit 90, three occurs periodically between the points a and b of the bridge a voltage difference $\Delta E$ with a peak value $\Delta V$ which is determined by the temperature difference $\Delta T$ as expressed by Equation (2) and a peak value V of the voltage E applied to the bridge.

$$\Delta V = K_2 \cdot \Delta T \cdot V \qquad (2)$$

where $K_2$ is a constant.

Therefore, from Equations (1) and (2) the following expression is derived.

$$K_3 \cdot \Delta V / V = P/G \qquad (3)$$

where $K_3$ is a constant.

Thus, if the peak value $\Delta V$ of the potential difference $\Delta E$ is made constant by controlling the supplied power P at the electric heater 10 and the peak value V of the voltage applied to the bridge, the relationship among the sucked air flow G, supplied power P and peak value V of the voltage E applied to the bridge is $$G = K_4 \cdot P \cdot V \qquad (4)$$

where $K_4$ is a constant.

If the resistance value of the output resistor 87 is selected to be smaller than that of the electric heater 10 and current I is flowed through the heater 10, Equations (5) and (6) are given as follows:

$$P \doteq K_5 \cdot I^2 \qquad (5)$$

$$V \doteq K_6 \cdot I \qquad (6)$$

where $K_5$ and $K_6$ are each a constant. Thus, Equation (4) is rewritten as $$G \doteq K \cdot I^3 \qquad (7)$$

where K is a constant.

Equation (7) shows that the sucked air flow G is approximately the function of the cube of the current I (or voltage). Since this approximation gives no influence on the measurement, Equation (7) can be practically used.

Thus, the measuring circuit 15 makes the peak value $\Delta V$ constant by controlling the calorific value of the heater 10. That is, increase of the sucked air flow will decrease the temperature rise of air which is heated by the electric heater 10, and as a consequence, the temperature difference $\Delta T$ between the first and second temperature dependent resistors 11 and 12 becomes small to decrease the peak value of the potential difference between the points a and b of the bridge.

Therefore, the output voltage $V_1$ from the AC differential amplifier circuit 55 has a small peak value and hence the peak value of the output voltage from the buffer amplifier circuit 75 is also decreased which shows the output produced after the output voltage $V_1$ is half-wave rectified. Accordingly, the voltage $V_2$ across the capacitor 79 in the sample-and-hold circuit 76 is also decreased thus to increase the output voltage $V_3$ which the DC differential amplifier circuit 80 produces in response to the voltage difference of $V_{r2} - V_2$. Thus, the power transistor 88 in the power amplifier circuit 86 increases the supply current to the electric heater 10 to cause the heater 10 to increase heat generation.

Consequently, the temperature difference $\Delta T$ between the first and second temperature dependent resistors 11 and 12 is increased to raise the peak value $\Delta V$ of the potential difference $\Delta E$ between the points a and b of the bridge. When the voltage $V_2$ having influence on the peak value $\Delta V$ is equal to the reference voltage $V_{r2}$, the whole system becomes stable while the bridge is kept in the unbalanced state.

When the sucked air flow is decreased, the temperature of air to be heated by the electric heater 10 rises with the result that the temperature difference $\Delta T$ between the first and second temperature dependent resistors 11 and 12 is increased to thus increase the peak value $\Delta V$ of the potential difference $\Delta E$.

Consequently, the peak value is increased of the output voltage $V_1$ from the AC differential amplifier circuit 55 and hence the output voltage $V_2$ from the sample-and-hold circuit 76 is also increased. As a result, the DC differential amplifier circuit 80 produces the output voltage $V_3$ decreased in accordance with the difference voltage of $V_{r2}-V_2$. The transistor 88 in the power amplifier circuit 86 is thus controlled by this voltage $V_3$ to decrease the current, which is to be supplied to the electric heater 10, and thus to cause the heater 10 to decrease heat generation.

Therefore, the temperature difference $\Delta T$ is decreased, resulting in decrease of the peak value $\Delta V$ of the potential difference $\Delta E$. Thus, when the voltage $V_2$ equals the reference voltage $V_{r2}$, the system and the bridge become both stable.

In this case the output voltage $V_1$ at a terminal F in the AC differential amplifier 55 becomes approximately rectangular with its average value equal to the reference voltage $V_{r1}$ as shown in (g) of FIG. 5, the output voltage appearing at a terminal H in the buffer amplifier 75 has a waveform shown in (h) of FIG. 5, and the output voltage $V_2$ appearing at a terminal J in the sample-and-hold circuit 76 becomes as shown in (i) of FIG. 5.

In other words, although the chopper circuit 90 is operated on the pulse signal $\bar{B}$ shown in (c) of FIG. 5 to supply its output to the bridge, the chopper output supplied to the bridge, when passed through the amplifier circuit 55, the rectifying circuit 65 and the buffer amplifier circuit 66, is rounded in its rising edges as shown in (h) of FIG. 5, and phase-shifted with respect to the pulse signal $\bar{B}$.

In this invention, however, the sample-and-hold circuit 76 is operated on the basis of the pulse signal C as shown in (d) of FIG. 5 which is applied to the FET 77, thereby to sample signals, and thus the sampling operation is synchronized with the period of the chopped voltage which is applied to the bridge, and performed during half the duration of the pulse signal $\bar{B}$. This sampling operation enables the leading ends and phase-shifted parts of the pulse waveform shown in (h) of FIG. 5 to be cut off. Thus, the output voltage from the sample-and-hold circuit 76 becomes stable with ripple reduced as a result of removing the rounded and phase-shifted parts of the pulse signal at the terminal H, and hence high-accuracy control is possible. The time during which sampling is performed is not restricted to half the pulse width of the pulse signal $\bar{B}$ but may be $\frac{1}{8}$, or $\frac{1}{4}$ the pulse width.

In this way, the peak value $\Delta V$ of the potential difference $\Delta E$ between the points a and b of the bridge is kept precisely constant at all times independently of the amount of the sucked air flow, and Equation (7) is satisfied, i.e., the sucked air flow G is expressed by the function of the cube of the current I flowing through the electric heater 10.

Since the current I flows through the output resistor 87, the current I varies as the voltage $V_o$ across the resistor 87 and the cube of this voltage $V_o$ is proportional to the absorbed air flow G.

This voltage $V_o$ is detected by the current detecting circuit 100 and thus a voltage $V_g$ associated with the sucked air flow is produced from the terminal OUT.

This voltage $V_g$ is applied to the fuel control unit 16 as a signal representative of the sucked air flow G. This fuel control unit 16 is thus supplied with this signal and the output signals from a rotational speed sensor and other sensors thereby to produce an injection pulse signal for opening the fuel injection valve 5.

Although the signal representative of the sucked air flow is determined by the current flowing through the electric heater 10, this signal may be determined by the voltage applied to the electric heater 10. The signal determined by current is substantially constant irrespective of temperature change of the atmosphere as indicated by a solid line in FIG. 6, and thus a desirable result is obtained. If measurement is made about the air flow the temperature of which is not changed by factors other than the electric heater 10, the voltage may be used for the determination.

Figure 6:
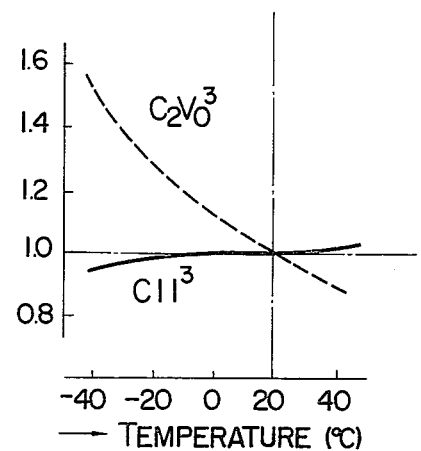

FIG. 6 shows plots of normalized value of measurements at different temperatures when a constant amount of air flow is sucked and a reference value at an atmospheric temperature of 20° C. is used for normalization. In FIG. 6, the solid line indicates the normalized value obtained by multiplying the cube of the current I flowing in the heater 10 by a constant $C_1$, and the broken line represents the normalized value obtained by multiplying the cube of the voltage $V_o$ applied to the heater 10 by $C_2$.

While the above embodiment is used with a fuel injection engine, the present invention can be used with a carburetor type engine in which the amount of exhaust gas recirculation and the amount of ignition advance are controlled by the sucked air flow. Moreover, the present invention can be used for measurement of gas flow in other industrial measuring fields as well as with engines.

It will be apparent that many modifications and variations may be effected without departing from the scope of the novel concepts of this invention.

We claim:

1. A gas flow measuring apparatus comprising:
   an electric heater provided in a flow measuring tube disposed in a duct through which a gas to be measured flows;
   a first temperature dependent resistor provided in said tube to be situated on the downstream side of said electric heater;
   a second temperature dependent resistor provided in said tube and connected in series with said first temperature dependent resistor, said second temperature dependent resistor being situated at a position where substantially no thermal influence of said electric heater is exerted;
   first and second reference resistors connected in series with each other and combined with said first and second temperature dependent resistors to form a bridge circuit;
   an oscillation circuit for oscillating pulse signals;
   an AC differential amplifier connected between a junction of said first and second temperature dependent resistors and a junction of said first and second reference resistors, for AC-amplifying the voltage between said junctions;
   a rectifying circuit connected to said AC differential amplifier circuit to rectify an output voltage thereof;
   a sample-and-hold circuit connected to said rectifying circuit and said oscillation circuit, synchronized with a pulse signal from said oscillation circuit, to sample an output voltage of said rectifying circuit during a part of a duration thereof and to hold the sampled voltage;
   a DC differential amplifier circuit connected to said sample-and-hold circuit, for differentially amplifying the output voltage thereof and a constant reference voltage;
   a power amplifier circuit connected to said DC differential amplifier circuit and said electric heater, for amplifying an output voltage of said DC differential amplifier circuit to control a voltage to be applied to said electric heater by the amplified output;

a chopper circuit connected to said power amplifier circuit, said bridge circuit and said oscillation circuit, for making the output voltage of said power amplifier circuit intermittent in synchronism with the signal of said oscillation circuit to supply the intermittent voltage to said bridge circuit; and a detecting circuit connected to said electric heater and said power amplifier circuit, for producing an output signal representative of the amount of flow of the gas to be measured.

2. A gas flow measuring apparatus according to claim 1, further comprising a logic means connected between said oscillation circuit and said sample-and-hold circuit, for receiving the pulse signals from said oscillation circuit to produce a logical output pulse signal that is used for the sampling operation of said sample-and-hold circuit to be performed at substantially the center of the duration of the output voltage of said rectifying circuit.

3. A gas flow measuring apparatus according to claim 1 or 2, wherein said detecting circuit detects a current to be supplied to said electric heater to produce a signal voltage representative of said amount of gas flow in accordance with said current.

4. A gas flow measuring apparatus according to claim 1 or 2, wherein each of said AC differential amplifier circuit and said rectifying circuit includes a differential operational amplifier, said differential operational amplifier having an input terminal connected to a ground resistor which is supplied with an imaginary ground potential higher than the true ground potential.

5. A gas flow measuring apparatus according to claim 1 or 2, wherein said rectifying circuit is of a half-wave rectifying type.

* * * * *